Aug. 21, 1934.  A. B. RYPINSKI  1,970,945
RADIATOR ENCLOSURE
Filed March 26, 1930   6 Sheets—Sheet 1
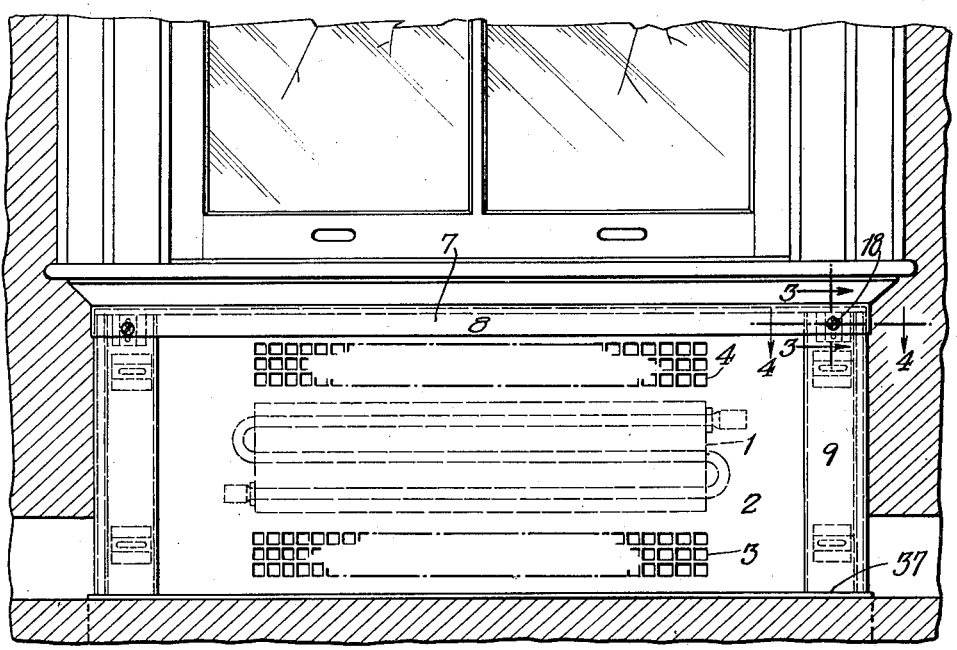
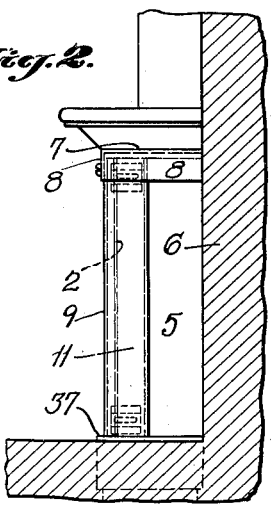
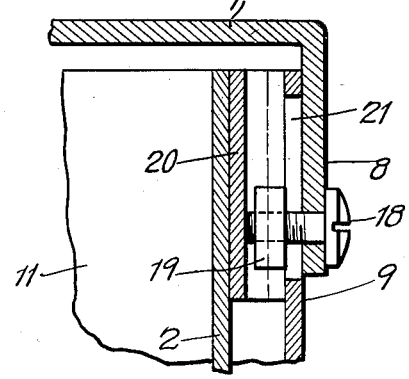
Inventor
ALBERT B. RYPINSKI,
By His Attorneys Aug. 21, 1934.     A. B. RYPINSKI     1,970,945
RADIATOR ENCLOSURE
Filed March 26, 1930     6 Sheets-Sheet 2
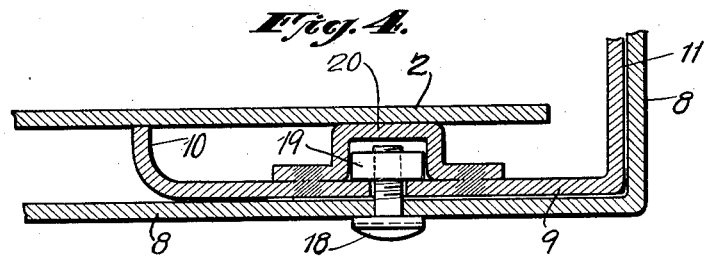
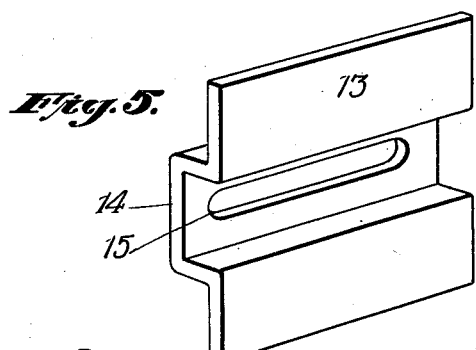
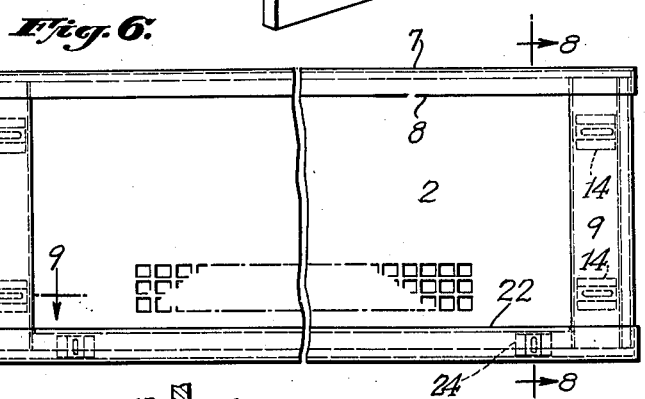
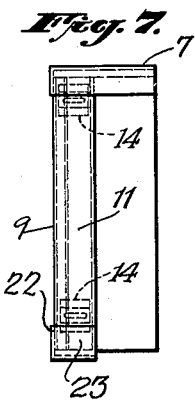
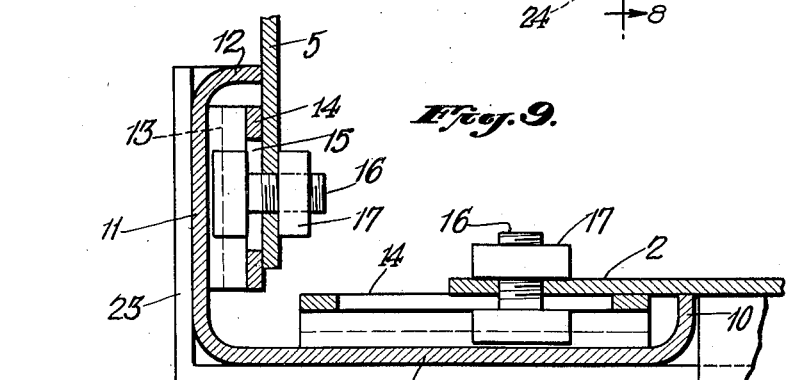
Inventor
ALBERT B. RYPINSKI.
By His Attorneys Aug. 21, 1934.  A. B. RYPINSKI  1,970,945
RADIATOR ENCLOSURE
Filed March 26, 1930  6 Sheets-Sheet 3
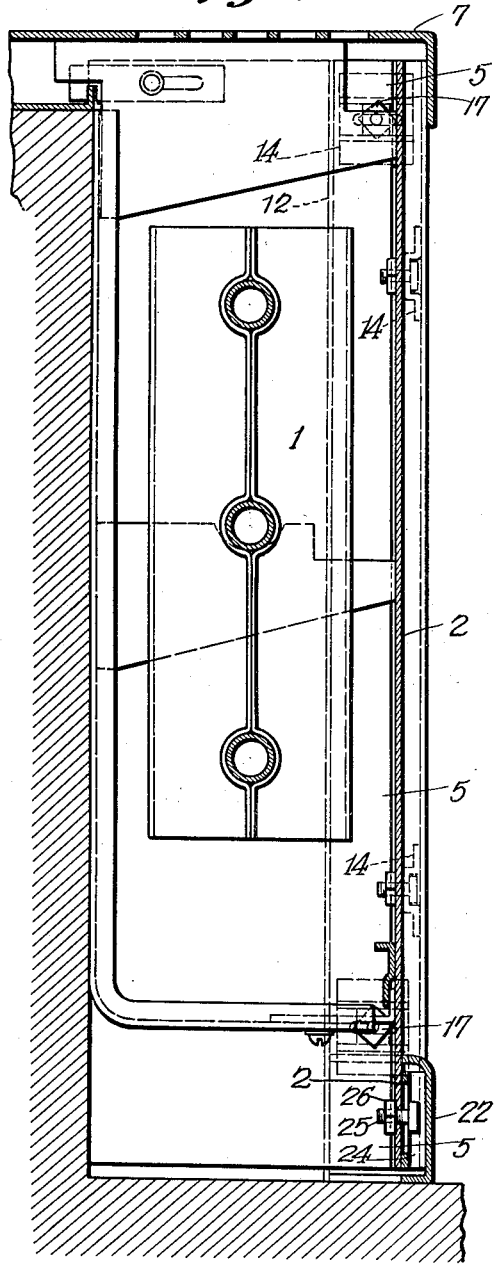
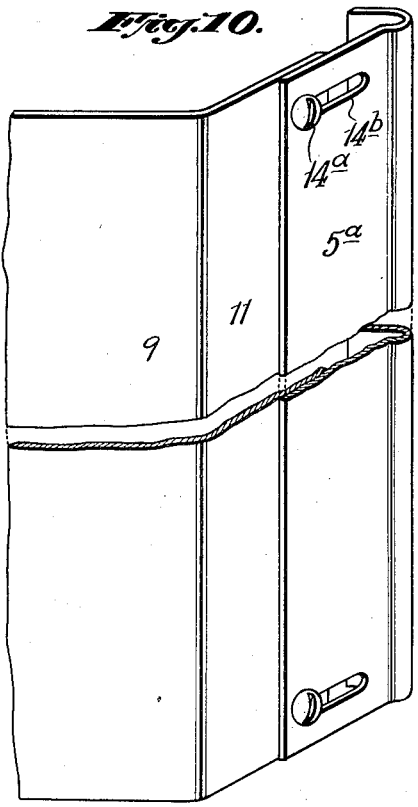
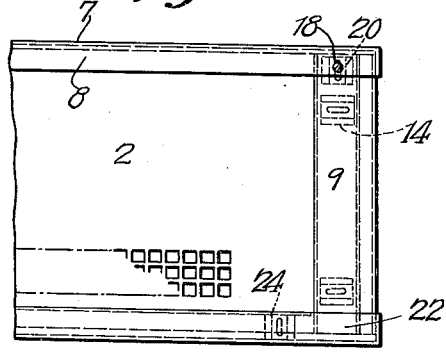
Inventor
ALBERT B. RYPINSKI.
By his Attorneys Aug. 21, 1934. A. B. RYPINSKI 1,970,945
RADIATOR ENCLOSURE
Filed March 26, 1930 6 Sheets-Sheet 4
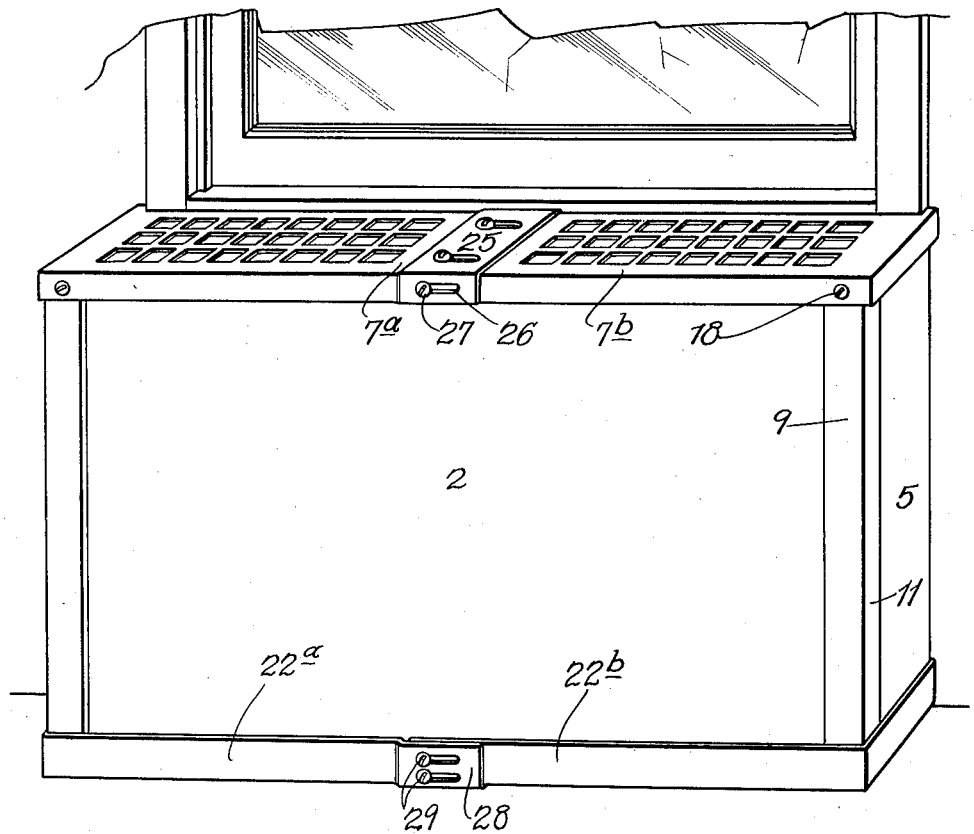
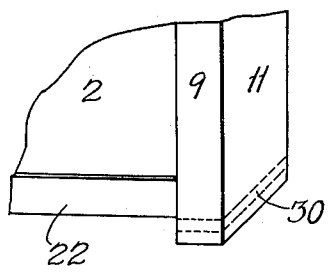
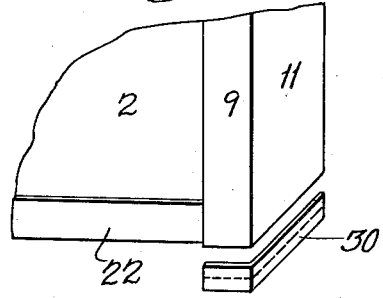
Inventor
ALBERT B. RYPINSKI
By His Attorneys Aug. 21, 1934.  A. B. RYPINSKI  1,970,945
RADIATOR ENCLOSURE
Filed March 26, 1930  6 Sheets-Sheet 5
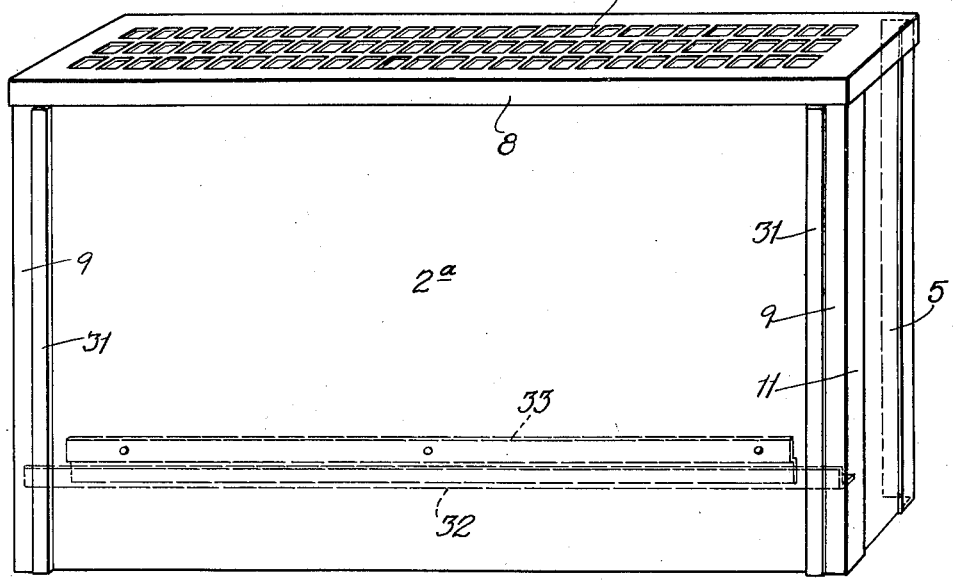
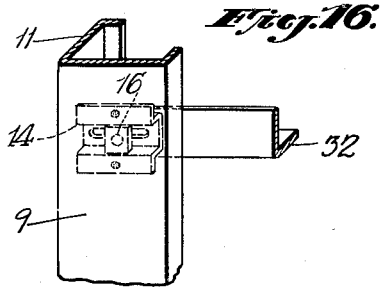
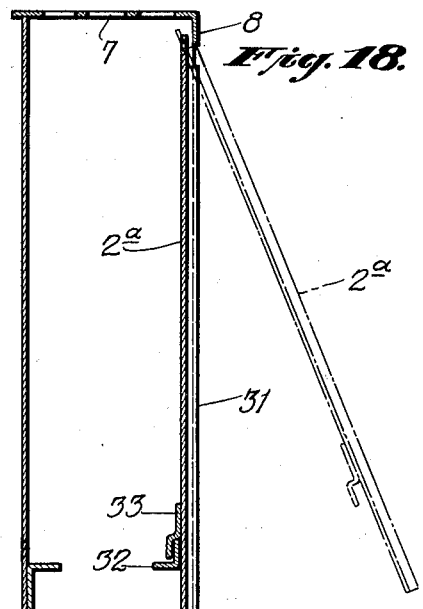
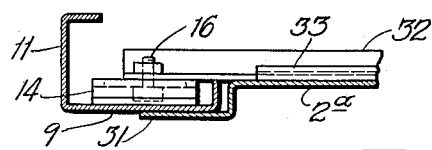
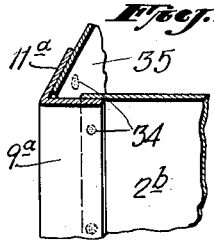
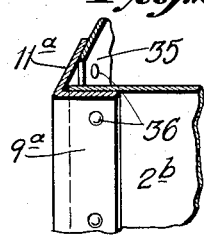
Inventor
ALBERT B. RYPINSKI
By his Attorneys Aug. 21, 1934.　　A. B. RYPINSKI　　1,970,945
RADIATOR ENCLOSURE
Filed March 26, 1930　　6 Sheets-Sheet 6
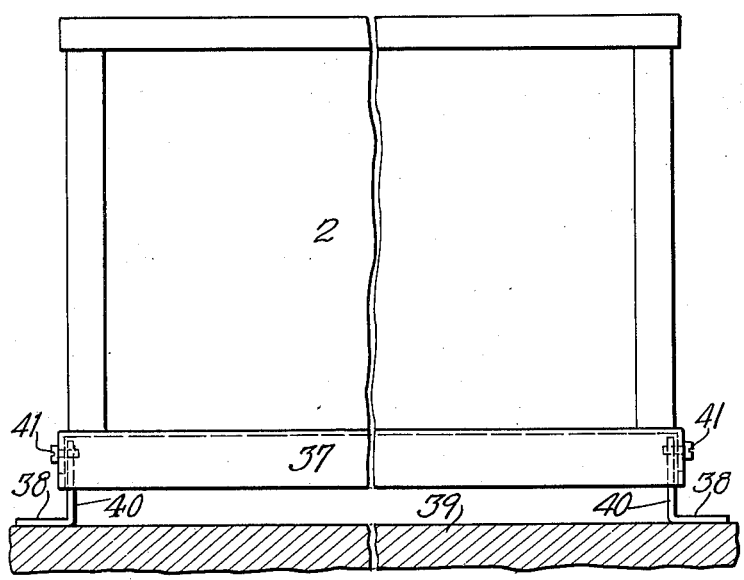
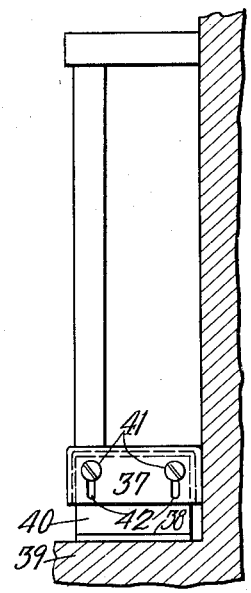
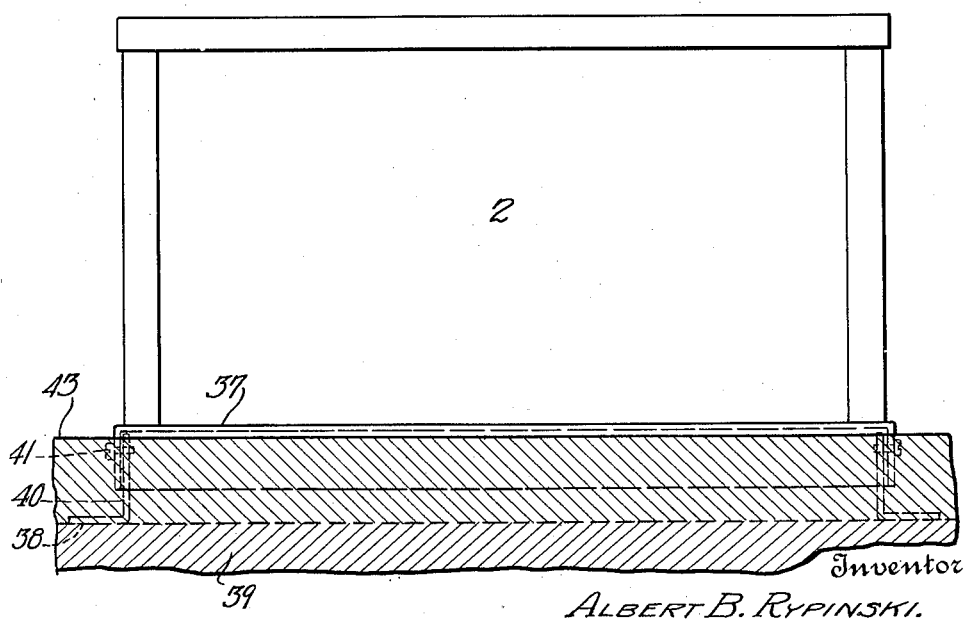
Inventor
ALBERT B. RYPINSKI.
By His Attorneys Patented Aug. 21, 1934

1,970,945

UNITED STATES PATENT OFFICE 1,970,945

RADIATOR ENCLOSURE

Albert B. Rypinski, Laurelton, Long Island, N. Y., assignor, by mesne assignments, to American Radiator and Standard Sanitary Corporation, New York, N. Y., a corporation of Delaware Application March 26, 1930, Serial No. 438,926

8 Claims. (Cl. 237—79)

In certain prior applications, such as Bennett Ser. No. 355,059, filed April 15, 1929 and Murray and Reynolds, Ser. No. 383,194, filed August 3, 1929, there are described certain methods of supporting and enclosing radiators for heating the air of a room. These radiators are housed within an enclosure which is buried in the building wall wholly or partly, or mounted on or adjacent to the face of the wall.

Radiators are generally mounted immediately below a window sill, particularly in office buildings. The size of the enclosures becomes, therefore, a function of the width of the window and the height of the sill from the floor. The windows in different buildings, and to a large extent in the same building, vary in width and in height of the sill. This is partly because of the architect's design and partly because in erecting the building there is no accurate control of the thickness of walls, plaster coatings and cement and wood floors. It has, therefore, been necessary to measure actual dimensions in the field before making such enclosures, in order to ensure a proper fit in the allotted space. This procedure is expensive and slow. It delays fabrication of the enclosures until after they are needed in a building. It also greatly increases the number of sizes which have to be produced.

To meet these conditions, the enclosure of the present invention is designed to be adjusted in one or more dimensions. It is proposed to manufacture a few standard sizes which will approximate the principal field sizes, and to adjust each enclosure to a proper fit in its allotted space at the time that it is installed.

Besides variations in rectangular dimensions which are encountered, there are often irregularities in the level of floors and in the wall faces; and the invention is designed to permit relative adjustment of different dimensions in a single enclosure so as to accommodate it to such irregularities in the allotted space.

The accompanying drawings illustrate embodiments of the invention.

Fig. 1 is a front elevation of a radiator enclosure in front of a window and below a sill;

Fig. 2 is a side elevation thereof;

Figs. 3 and 4 are sections of details on the lines 3—3 and 4—4 of Fig. 1;

Fig. 5 is a perspective view of a part of the connecting means between different elements of the enclosure;

Fig. 6 is a front elevation and Fig. 7 an end elevation of an alternative construction;

Fig. 8 is a section on the line 8—8 of Fig. 6;

Fig. 9 is a horizontal section on the line 9—9 of Fig. 6;

Fig. 10 is a perspective view of a modification;

Fig. 11 is a front elevation showing a combination of the features of Figs. 1 and 6.

Fig. 12 is a perspective view illustrating another modification;

Figs. 13 and 14 are perspectives of the lower end of a corner post illustrating a further modification;

Fig. 15 is a perspective of still another modification;

Figs. 16 and 17 are detail views of the modification shown in Fig. 15;

Fig. 18 is a diagram in vertical cross section of Fig. 15;

Figs. 19 and 20 are perspectives of other modifications of corner joints;

Figs. 21 and 22 are front and end views of another modification;

Fig. 23 is similar to Fig. 21, but showing a completed floor.

The radiator 1 shown in dotted lines in Fig. 1 is of the Murray convection type described in the previous applications above cited and is supported from the wall or floor, or in any other suitable way.

The casing has a front plate 2 with openings 3 at the bottom for admitting air and openings 4 at the top for the escape of the heated air. End plates 5 extend back to the wall 6. A top plate 7 has flanges 8 on its front edge and ends which embrace the upper part of the enclosure. The lower edge of the enclosure may extend down to the floor as shown in Figs. 1 and 2. The top plate may be in effect an extension of the sill with openings through it for the escape of the heated air, or it may be a closed plate requiring openings like those at 4 through the upper portion of the front plate for discharge of the heated air.

The front plates and the end plates are connected to each other by means of corner posts and certain fastening devices carried thereby. Such fastening devices are illustrated in Fig. 9. Each corner post is angular in horizontal section with a front portion 9 having a flange 10 and an end portion 11 with a flange 12. On the inner side of each post there are fastening devices for making horizontally adjustable connections with the front 2 and end plates 5. These fastening devices are substantially alike. There is a keeper (Fig. 5) or strap having flanges 13 which are spot welded against the inner face of the post and a horizontally extending recessed portion 14 with a horizontal slot 15 through it.

As shown in Fig. 9, each of the plates 14 encloses the head of a bolt 16 and prevents its rotation. The bolt is threaded or passed through the front or end plate and fastened by a nut 17 on the inside so that the fastening means do not show at the outside of the enclosure. The edges of the flanges 10 and 12 are flush with the faces of the keepers 14 and provide additional bearings for the plates 2 and 5.

For fastening the top, a screw 18 (Figs. 3 and 4) is passed through the flange 8 and into a nut 19 which is held within a similar strap or keeper 20, with a vertically extending recess and with flanges welded to the part 9 of the post. The post has a vertical slot 21 through which the shank of the screw passes so as to permit vertical adjustment.

The adjustable connections above described are repeated at the two ends of the enclosure. Thus within the limits of the slots the length and width of the enclosure may be increased or diminished; the width at one side may be greater or less than that at the other in order to fit an irregular wall condition. The top being fixed, the assembled sides and ends may be lowered or raised to fit the distance to the floor; and where the floor level is irregular this adjustment may be made to a different extent at opposite ends.

Figs. 6 to 8 show similar adjustments of the front and end plates, the locations of the adjustable fastening bolts being indicated by the straps 14 shown in dotted lines. The top in this case rests on the assembled front and end plates and corner posts and this assembly is made adjustable with respect to a floor plate or strip 22 which runs the length of the front plate and is provided with flanges 23 extending around the ends, Figures 7 and 9.

In order to raise the enclosure there are provided slotted keepers 24 welded near each end of the strip 22 with vertical slots through which pass bolts 25 passing also through front plates 2 and fastened by means of nuts 26 on their inner ends. The side and end plates being fastened together, this adjustment will lift the entire enclosure, equally or unequally at opposite ends as circumstances require.

The vertical adjustment may be omitted entirely. Or a vertical adjustment of the top plate with respect to the body of the enclosure and also of the body with respect to a base strip may be provided. See Fig. 11. Here the flange 8 of the top plate is fastened by a screw 18 passing through a vertical slot in the front plate and into a nut 19 (Fig. 3) held by the keeper 20. Lateral adjusting means are provided as indicated by the location of the keepers 14, which are repeated both for the front plate and for the end plates. There are also a base strip 22 and a vertically adjustable connection between it and the front plate as indicated by the keeper 24 with its vertical slot.

Fig. 10 shows an alternative form having a lateral adjustment at the ends. The corner post 9, 11 is fastened to end plates 5ª in the form of moldings bearing at each edge against the wall. The fastening screws 14ª pass through slots 14ᵇ which permit lateral adjustment at top and bottom.

According to Fig. 1 the maximum length and width of the enclosure are fixed by the length and width of the top plate 7.

According to Fig. 6 these dimensions are limited by both the top plate 7 and the bottom plate 22. The top and bottom plates may also be extensible lengthwise.

Fig. 12 illustrates such a construction. In this the top plate is made in two parts 7ª and 7ᵇ. The former has a portion 25 overlapping the end of the other section and provided with longitudinal slots 26 in the top as well as in the flange. Screws 27 pass through the slots and are threaded into the underlying portion of the other section. By loosening the screws, adjustment as to length can be effected. Similarly the strip at the bottom is made in two parts 22ª and 22ᵇ, the former having an end portion 28 which overlaps the other and is slotted to receive screws 29 threaded into the underplate. Otherwise the construction is the same as in Fig. 1 or Fig. 6; the parts shown in dotted lines in these figures being omitted.

The height may be varied by the use of removable portions on the lower ends of the corner posts 9.

The top plate does not ordinarily need to be made adjustable as to length. The window sill is often supplied as part of the window by one manufacturer, and the top of the enclosure goes with it; whereas the rest of the enclosure is supplied by another manufacturer. In that case it is important for the enclosure to be adjustable so it can be fitted in under a number of different length sills and top plates.

In Fig. 13, for example, the corner post is made with extensions 30 at the lower end which are scored or otherwise weakened so that they may be twisted off like the knock-outs which are common in sheet metal boxes for electrical equipment. Fig. 14 shows two of such sections twisted off from the lower end of the post.

It is advantageous to be able to remove the front panel 2, and the adjustable parts may be designed with that end in view as shown in Figs. 15 to 18. The plate 2ª in this case has its side portions offset outward as at 31 to overlap the end posts 9. A supporting bar or rail 32 is fastened at its ends within the corner posts by connections adjustable as in Fig. 9, so as to permit adjustment of the length of the enclosure.

The front panel 2ª has on its inner face a strip 33 which is offset so as to catch over the rail 32. In this position, Fig. 18, the top of the panel hangs down below the top plate 7, just within the lower part of the flange 8. The distance is such that when the panel is lifted the strip 33 can be raised clear above the rail 32 and the panel swung out to the dotted line position and then dropped to remove it from engagement with the overhanging flange 8.

The adjustable connections for varying the height, width and length may be made in the field by means of the bolts and screws above described, or they may be of the sort which cannot be conveniently made except in the factory, as by welding, riveting or otherwise permanently fastening the parts together in different positions.

Fig. 19 shows the front plate 2ᵇ of an enclosure with an end post 9ª, 11ª, there being another end post symmetrically arranged at the opposite end of the front plate. By making the front flange 9ª with sufficient overlap upon the edges of the panel 2ᵇ, the parts may be spot-welded as at 34, with the corner posts farther apart or closer together as desired, and with a corresponding variation in total length. Similarly this overlapping arrangement permits fastening in different vertical positions of adjustment of the front panel with respect to the end posts.

Similarly end plates 35 may be welded in different lateral and vertical positions of adjustment to the overlapping flange 11ª of the end post.

Fig. 20 shows the same idea, the parts, however, being fastened by rivets 36. The same capability of adjustment exists as in Fig. 19. The parts are clamped together and riveted in the desired positions. In this figure the length is adjusted to the shortest possible and the width adjusted to the longest; whereas in Fig. 19 the length is made as great as possible and the width as little as possible.

The adjustability of the base of the enclosure may be utilized to line it up with the floor of a building, either level therewith or at some other definite relation thereto. This is illustrated in connection with Figs. 21, 22 and 23.

A base 37 consisting of a plate with depending flanges at the front and ends is to be provided for any one of the enclosures previously described, or in fact for enclosures of various other types, and is to be set at a certain height. At each end there are angles having flanges 38 mounted on the rough concrete sub-floor 39 and having vertical flanges 40 which engage the inner faces of the end flanges of the base 37. As shown in Fig. 22, screws 41 pass through slots 42 in the base and are threaded into the vertical portions 40 of the angle legs. By this means the height is adjusted until the top of the base, at each end, is just the right distance below the window sill. The finished floor 43 is then poured of concrete embedding the base to a greater or less height and fixing it rigidly in place. This is important because the distance from the finished floor line to the window sill varies, sometimes as much as an inch and a half, from the distance given on the plan in many large buildings. The reason is that the sill height is determined by the masonry of the outside walls, whereas the finished floor level is determined by the level of the steel work on the stairway landing on each floor. As shown in Figs. 21 and 23 the ends are separately adjustable so that when the flanges 38 rest on a sub-floor which is out of level with the window sill, the two end flanges can be relatively adjusted to bring the base (and consequently the top of the enclosure) parallel with and at a determined vertical distance from the window sill before finishing the floor.

Such a base 37 is indicated under the enclosure of Fig. 1, and it may be used in connection with the enclosures shown in the several other figures.

Various modifications in detail may be made by those skilled in the art without departing from the invention as defined in the following claims.

I claim:

1. A radiator enclosure comprising in combination corner posts, a front plate and end plates in overlapping adjustable relation to said corner posts, a base strip substantially parallel with said front plate, laterally adjustable connecting means between said plate and said posts to vary the length and breadth of the enclosure, and vertically adjustable means for connecting the plate and post assembly in position relative to the base strip.

2. A radiator enclosure including in combination corner posts, a front plate and end plates in overlapping adjustable relation to said corner posts, a top plate, a base strip substantially parallel with said front plate, laterally adjustable connecting means between said plate and said posts to vary the length and breadth of the enclosure, and vertically adjustable means for connecting the front and end plates in position relative to the top plate and to the base strip respectively.

3. A radiator enclosure comprising in combination posts adjustable to and from each other, a front plate in overlapping adjustable relation to said posts and of substantially the height of the radiator enclosure, and laterally adjustable connecting means between said plate and said posts for securing said plate to said posts in laterally adjustable positions to vary the length of the enclosure.

4. A radiator enclosure comprising in combination corner posts and a front plate in adjustable overlapping relation to said corner posts and of substantially the height of said radiator, end plates in adjustable overlapping relation to said posts, and laterally adjustable connecting means between the front plate and said posts and also between the end plates and said posts for securing said plates to said posts in laterally adjustable positions to vary the length and breadth of the enclosure.

5. A radiator enclosure including in combination corner posts, a front plate in adjustable overlapping relation to said corner posts, a top plate, said plates extending over substantially the entire height and width respectively of the radiator enclosure, laterally adjustable connecting means between the front plate and said posts for securing said plates to said posts in adjustable positions to vary the length of the enclosure, and vertically adjustable means connecting said top plate to the posts at an adjustable height relative thereto.

6. A radiator enclosure including in combination corner posts, a front plate in adjustable overlapping relation to said corner posts, a top plate, said plate extending over substantially the entire height and width respectively of the radiator space, laterally adjustable connecting means between the front plate and said posts for securing said plate to said posts in laterally adjustable positions to vary the length of the enclosure, and vertically adjustable means for connecting said top plate directly to said posts at an adjustable height in relation thereto.

7. A radiator enclosure including in combination corner posts, a front plate and end plates in adjustable overlapping relation to said corner posts, laterally adjustable connecting means between said front plate and said posts and also between said end plates and said posts for securing said plates to said posts in laterally adjustable positions to vary the length and width of the enclosure, a top plate, and vertically adjustable means for connecting said top plate to the plate and post assembly at an adjustable height relative thereto.

8. A radiator enclosure including in combination corner posts, a front plate and end plates in adjustable overlapping relation to said corner posts, laterally adjustable connecting means between said front plate and said posts and also between said end plates and said posts for securing said plates to said posts to vary the length and breadth of the enclosure, a top plate, and vertically adjustable means for connecting said top plate directly to said posts.

ALBERT B. RYPINSKI.